(12) United States Patent
Cogen et al.

(10) Patent No.: US 8,426,519 B2
(45) Date of Patent: Apr. 23, 2013

(54) SILICONE-THERMOPLASTIC POLYMER REACTIVE BLENDS AND COPOLYMER PRODUCTS

(75) Inventors: Jeffrey M. Cogen, Flemington, NJ (US); Mohamed Esseghir, Monroe Township, NJ (US); Andrew Hilmer, Oshkosh, WI (US)

(73) Assignee: Union Carbide Chemicals & Plastics Technology LLC, Midland, MI (US)

( * ) Notice: Subject to any disclaimer, the term of this patent is extended or adjusted under 35 U.S.C. 154(b) by 204 days.

(21) Appl. No.: 13/057,033

(22) PCT Filed: Jul. 24, 2009

(86) PCT No.: PCT/US2009/051610
§ 371 (c)(1),
(2), (4) Date: Feb. 1, 2011

(87) PCT Pub. No.: WO2010/014499
PCT Pub. Date: Feb. 4, 2010

(65) Prior Publication Data
US 2011/0136979 A1    Jun. 9, 2011

Related U.S. Application Data

(60) Provisional application No. 61/085,638, filed on Aug. 1, 2008.

(51) Int. Cl.
*C08F 8/00*    (2006.01)
(52) U.S. Cl.
USPC .......................................................... 525/100
(58) Field of Classification Search ............. 525/100
See application file for complete search history.

(56) References Cited

U.S. PATENT DOCUMENTS

| | | | |
|---|---|---|---|
| 4,018,852 A | | 4/1977 | Schober et al. |
| 4,148,838 A | * | 4/1979 | Martin .......................... 525/271 |
| 5,266,627 A | | 11/1993 | Meverden et al. |
| 5,272,236 A | | 12/1993 | Lai et al. |
| 5,278,272 A | | 1/1994 | Lai et al. |
| 5,346,961 A | | 9/1994 | Shaw et al. |
| 5,488,087 A | | 1/1996 | Cabasso et al. |
| 5,741,859 A | | 4/1998 | Saxena et al. |
| 5,854,356 A | | 12/1998 | Bergstrom et al. |
| 5,986,028 A | | 11/1999 | Lai et al. |
| 6,054,548 A | | 4/2000 | Currie et al. |
| 6,201,064 B1 | * | 3/2001 | Aoyama et al. ................. 525/63 |
| 6,258,891 B1 | | 7/2001 | Hoxmeier |
| 6,555,662 B1 | * | 4/2003 | Bischoff et al. ............... 556/450 |
| 7,355,089 B2 | | 4/2008 | Chang et al. |
| 7,589,154 B2 | * | 9/2009 | Rakhman et al. ............. 525/195 |
| 2006/0223943 A1 | | 10/2006 | Sakamoto et al. |

OTHER PUBLICATIONS

Silicones, Encyclopedia of Polymer Science and Technology, Apr. 15, 2003, p. 765-841.

* cited by examiner

*Primary Examiner* — Margaret Moore
(74) *Attorney, Agent, or Firm* — Whyte Hirschboeck Dudek SC

(57) ABSTRACT

Silicone-thermoplastic polymer reactive blends and copolymer products are prepared using economical post-reactor reactive mixing, e.g., extrusion. The procedure is based on the ring-opening polymerization of cyclic siloxanes within a thermoplastic polymer matrix. In a preferred mode, the thermoplastic polymer is a polyolefin, optionally containing silane groups that are available for reaction with the silicone polymer that is formed in situ. The resulting materials provide hybrid performance that can extend the range of applications beyond those which are served by thermoplastic polymers or silicones alone, or their physical blends.

4 Claims, 2 Drawing Sheets

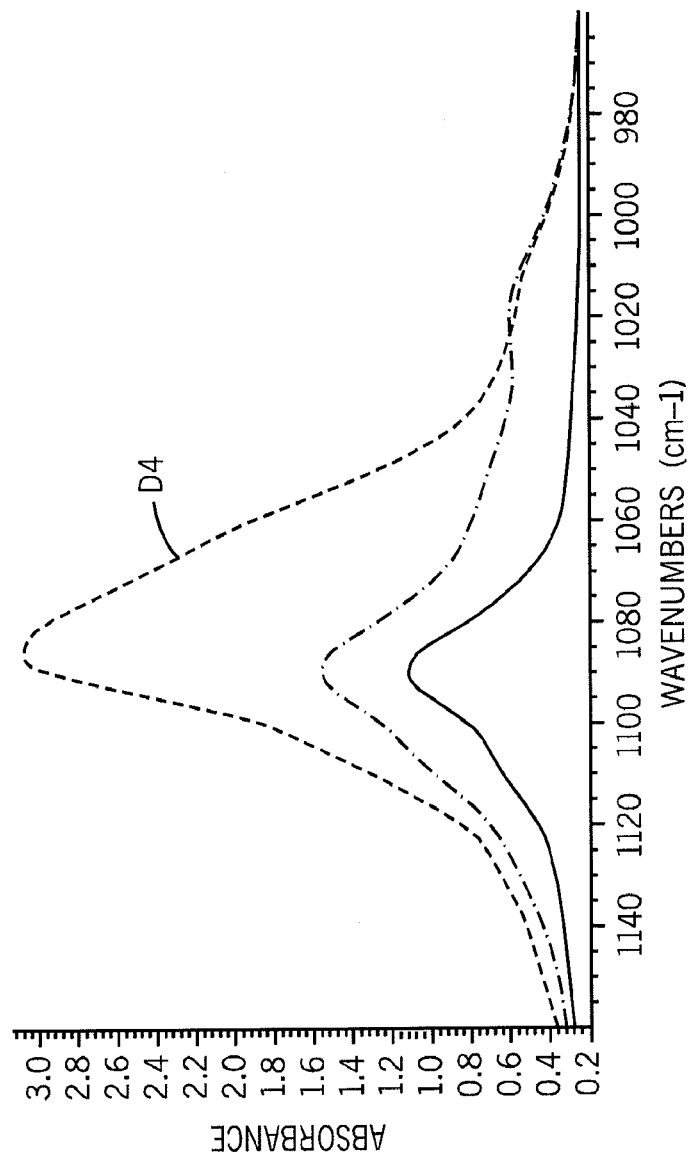

SILICONE-THERMOPLASTIC POLYMER REACTIVE BLENDS AND COPOLYMER PRODUCTS

CROSS REFERENCE TO RELATED APPLICATION

The present application claims priority to U.S. patent application Ser. No. 61/085,638, filed on Aug. 1, 2008, the entire content of which is incorporated by reference herein.

FIELD OF THE INVENTION

This invention relates to silicone-thermoplastic polymer reactive blends and copolymer products. In one aspect, the invention relates to a process for making such blends and products in which a cyclic silicone is polymerized within a thermoplastic polymer matrix while in another aspect, the invention relates to such a process in which the thermoplastic polymer is a polyolefin, optionally functionalized with silane groups, and the cyclic silicone is polymerized with the aid of a ring-opening catalyst.

BACKGROUND OF THE INVENTION

Silicone polymers are used in a variety of applications in which they are valued for their unique combination of attributes, including thermal stability, ozone and weathering resistance, oxidative stability, lubricity, water repellency, low surface tension, good electrical properties, low temperature properties, oil, moisture and steam resistance, chemical resistance, and flame resistance. Reactive blends and copolymers of silicones and various thermoplastic polymers, particularly polyolefin polymers, can provide hybrid performance that can extend the range of applications beyond those which are served by the thermoplastic polymer or silicone polymer alone, or their physical blends. In addition, these blends and copolymers offer performance and/or cost advantages relative to neat silicone polymers or pure thermoplastic polymers.

U.S. Pat. No. 5,488,087 describes blends of sulfonated polyethylene and octamethylcyclotetrasiloxane in which the sulfonate groups on the polyethylene catalyze the ring-opening polymerization of the siloxane. Rates of reaction are quite slow, requiring weeks to reach extensive levels of polymerization, and the reference does not teach or suggest either a mechanism for or the grafting of the resulting silicone to the polymer.

US Patent Application Publication 2006/0217460 describes compositions comprising various polyolefins, an inorganic flame retardant, and a silicone which may be cyclic. The cyclic silicone is provided to coat the surface of the flame retardant. The composition does not include a polyolefin comprising grafted silanes, and it does not suggest that the cyclic silicone grafts to the polyolefin upon polymerizing to form a siloxane polymer. Furthermore, the process for making the siloxane polymer does not include a catalyst. Still further, the silicone coating of the flame retardant is formed prior to adding the flame retardant to the polyolefin.

US Patent Application Publication 2006/0223943 describes a polyolefin graft copolymer produced in the presence of a late transition metal complex coordination polymerization catalyst by graft copolymerization of an olefin monomer with a silicone macromonomer produced by emulsion polymerization. The silicone macromonomer is produced by the reaction of an organosiloxane with a compound having in its molecule a functional group reactive with the organosiloxane.

U.S. Pat. No. 5,854,356 describes silicone-grafted polyolefins made by the compounding of silicones with reactive polyolefins comprising ethylene-vinyltrimethoxy silane copolymer or ethylene-hydroxyethyl methacrylate copolymer. The resulting silicone-grafted polyolefins exhibit excellent release (low adhesion) properties which can be further improved upon the use of dibutyl tin dilaurate as a condensation catalyst. Blends of silicone-functionalized polyethylene with unmodified polyethylene also exhibit release properties.

U.S. Pat. No. 6,054,548 describes useful phosphazene base catalysts for ring-opening polymerization of cyclic silicones. Use of such catalysts with silicones within a polyolefin matrix is not described.

Improved processes are desired to make silicone-thermoplastic polymer reactive blends and copolymer products using economical post-reactor compounding and/or extrusion equipment. The present processes for making such reactive blends are limited, and involve either in-reactor chemistry or reactive compounding of an incompatible mixture of a thermoplastic polymer and a difficult-to-handle, high-molecular weight silicone polymer.

BRIEF SUMMARY OF THE INVENTION

Silicone-thermoplastic polymer reactive blends and copolymer products are prepared using economical post-reactor reactive mixing, e.g., extrusion. The procedure is based on the ring-opening polymerization of cyclic siloxanes within a thermoplastic polymer matrix. In a preferred mode, the thermoplastic polymer is a polyolefin, optionally containing silane groups that are available for reaction with the silicone polymer that is formed in situ. The resulting materials provide hybrid performance that can extend the range of applications beyond those which are served by thermoplastic polymers or silicone polymers alone, or their physical blends. In addition, they offer performance and/or cost advantages versus neat thermoplastic polymers or silicone polymers. In one embodiment, the process employs a phosphazene base as a catalyst. In another embodiment, the process comprises the in situ reaction of a monohydroxysilicone with a silane-functionalized polymer.

In one embodiment the invention is a process for making a reactive blend comprising a silicone polymer within a thermoplastic polymer matrix, the process comprising the steps of (A) forming a mixture of a cyclic siloxane and a thermoplastic polymer, and (B) subjecting the mixture to conditions under which the cyclic siloxane is polymerized to form a silicone polymer. Preferably the cyclic siloxane is polymerized using a catalyst to open the ring.

In one embodiment the invention is a single-operation process for making a copolymer product comprising units derived from a thermoplastic polymer, preferably a polyolefin polymer, a silane crosslinker and a silicone polymer, the process comprising the steps of (i) contacting the silane crosslinker with the thermoplastic polymer under grafting conditions such that the silane crosslinker grafts to the thermoplastic polymer, and (ii) adding a cyclic siloxane to the silane-grafted thermoplastic polymer under cyclic siloxane polymerization conditions such that the silicone polymer is formed and reacts with the silane-grafted thermoplastic polymer. In one variation on this embodiment, the first and second steps are conducted in a long extruder, the first step conducted in a grafting zone and the second step conducted in a ring-opening, polymerization zone. In another variation on this embodiment, the grafting and ring-opening/polymerization steps are conducted simultaneously or near simultaneously.

In one embodiment the invention is a reactive blend or copolymer comprising the reaction product of a silicone polymer and a thermoplastic polymer, preferably a polyolefin polymer, while in another embodiment, the invention is the reaction product of a silicone polymer and a silane-grafted polyolefin. In still another embodiment, the invention is the reaction blend or copolymer product made by one of the processes described above. In yet another embodiment, the invention is an article comprising the reactive blend or copolymer product.

BRIEF DESCRIPTION OF THE DRAWINGS

FIG. 2 is a FTIR chart showing the ring-opening of octamethylcyclotetetrasiloxane and the formation of polydimethyl silicone in the presence of a phosphazene base and within a polyolefin matrix.

DETAILED DESCRIPTION OF THE PREFERRED EMBODIMENT

Figure 1:
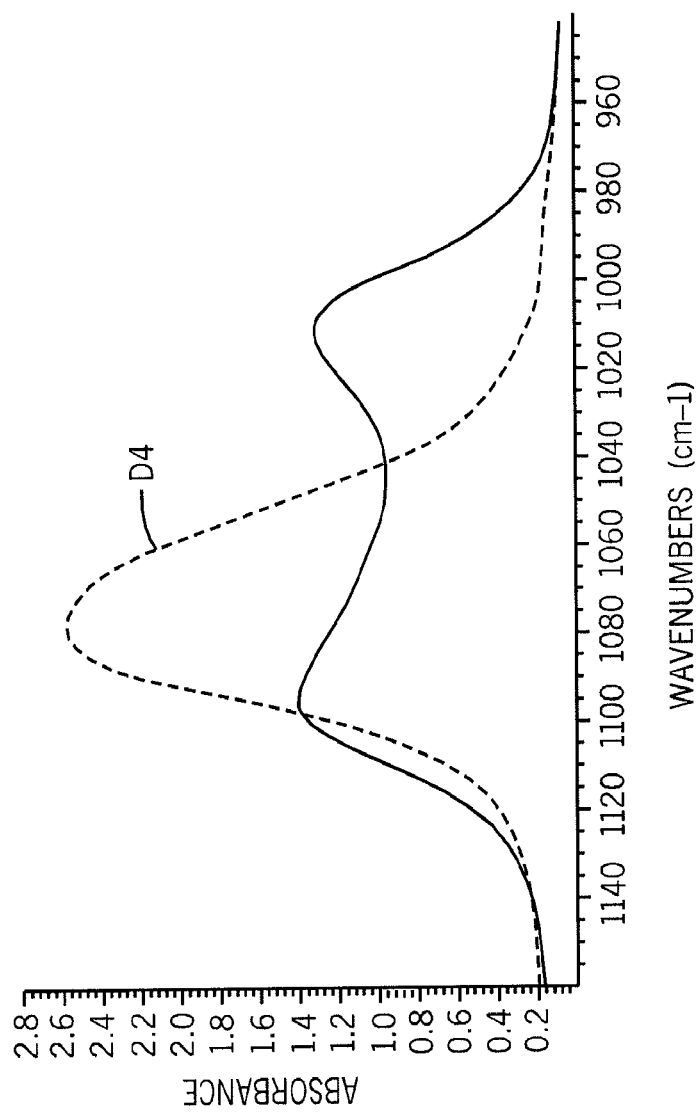
FIG. 1 is a Fourier Transformation Infrared (FTIR) chart showing the ring-opening of octamethylcyclotetetrasiloxane and the formation of polydimethyl silicone.

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, melt index or temperature, is from 100 to 500, it is intended that all individual values, such as 100, 101, 102, etc., and sub ranges, such as 100 to 144, 155 to 170, 197 to 200, etc., are expressly enumerated. For ranges containing values that are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, density, melt index, cyclic siloxane, thermoplastic polymer and/or catalyst content of the reaction mixtures and products, the graft content of the thermoplastic polymer, and various process parameters.

The term "comprising" and its derivatives are not intended to exclude the presence of any additional component, step or procedure, whether or not the same is specifically disclosed. In order to avoid any doubt, all compositions claimed through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

As used with respect to a chemical compound, unless specifically indicated otherwise, the singular includes all isomeric forms and vice versa (for example, "hexane", includes all isomers of hexane individually or collectively). The terms "compound" and "complex" are used interchangeably to refer to organic-, inorganic- and organometal compounds. The term, "atom" refers to the smallest constituent of an element regardless of ionic state, that is, whether or not the same bears a charge or partial charge or is bonded to another atom. The term "amorphous" refers to a polymer lacking a crystalline melting point as determined by differential scanning calorimetry (DSC) or equivalent technique.

"Composition" and like terms mean a mixture of two or more materials. Included in compositions are pre-reaction, reaction and post-reaction mixtures the latter of which will include reaction products and by-products as well as unreacted components of the reaction mixture and decomposition products, if any, formed from the one or more components of the pre-reaction or reaction mixture.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Reactive blend", "in-reactor blend" and like terms mean a reaction product made from a reaction mixture of two or more components of which at least is reacted in the presence of one or more of the other components, or all the components are reacted at essentially the same time. The components can react with themselves, as in the case of homo-polymerization, or with one or more of the other components, as in the case of copolymerization or grafting. In the context of this invention, one example of a reactive blend is a reaction product comprising polyolefin and silicone polymers in which the silicone polymer was formed in the presence of the polyolefin polymer, i.e., the polyolefin polymer was a component of the reaction mixture in which the silicone polymer was formed. Another example of a reactive blend in the context of this invention is a reaction product comprising silane-grafted polyolefin polymer and silicone polymer in which both the silane-grafted polyolefin polymer and silicone polymer are made at the same time and/or from the same reaction mixture.

"Physical blend", "physical polymer blend" and like terms mean a post-reactor polymer blend, i.e., a blend that is the result of mixing two or polymers with one another under conditions in which the polymers do not react with one another. In a physical blend, the polymer components are physically intermingled with one another, not reacted with one another to form a new, larger molecules.

"Copolymer product" and like terms mean a product that is formed from the reaction of two or more monomers or polymers with each other. In the context of this invention, an example of a copolymer product is the product formed by the reaction of a silicone polymer with a silane-functionalized polyolefin polymer.

"Reaction mixture", "reaction mass" and like terms means the combination of materials necessary or ancillary to a reaction, typically under reactive conditions. Over the course of a reaction, a reaction mixture converts into a product mixture. Depending upon the moment in time in which the reaction mixture is characterized and other factors such as whether the process is batch or continuous, the physical state of the starting and product materials, etc., it will or can contain the reactants, catalyst, solvent, processing aids, products, byproducts, impurities and the like.

"Product mixture" and like terms means the combination of materials resulting from subjecting a reaction mixture to reaction conditions. A product mixture will always contain some product and/or byproduct and depending upon a multiplicity of factors (e.g., batch versus continuous, physical state of the starting materials, etc.), it may or may not contain unreacted starting materials, catalyst, solvent, processing aids, impurities, and the like.

"Reaction conditions" and like terms generally refer to temperature, pressure, reactant concentrations, catalyst concentration, cocatalyst concentration, mixing or shear and the like that transform a reaction mixture into a product mixture. Reaction conditions influence not only the rate of reaction and conversion and selectivity starting reagents into reaction products, but often also influence the properties of the reaction products.

"Ring-opening conditions" and like terms mean the reaction conditions necessary to open the ring of a cyclic siloxane within a thermoplastic polymer matrix. These conditions will vary with the polymer matrix, the nature and structure of the siloxane, the presence or absence of a ring-opening catalyst, the presence or absence of process additives, and the like.

"Polymerization conditions" and like terms mean the reaction conditions necessary to combine monomers into polymers. In the context of this invention, these conditions are those necessary for ring-opened cyclic siloxanes to combine with one another to form a silicone polymer within a polymer matrix.

"Polymer" means a polymeric compound prepared by polymerizing monomers, whether of the same or a different type. The generic term polymer thus embraces the term homopolymer, usually employed to refer to polymers prepared from only one type of monomer, and the term interpolymer as defined below. It also embraces all forms of interpolymers, e.g., random, block, etc. The terms "ethylene/α-olefin polymer", "propylene/α-olefin polymer" and "silane copolymer" are indicative of interpolymers as described below.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Catalytic amount" and like terms means an amount of catalyst sufficient to promote the rate of reaction between two or more reactants by a discernable degree. In the context of this invention, a catalytic amount is the amount of catalyst necessary to promote the rate of polymerization of the cyclic siloxane, or the rate of reaction of the siloxane with the silane group on the matrix polymer.

"Crosslinking amount" and like terms means an amount of crosslinking agent or radiation or moisture or any other crosslinking compound or energy sufficient to impart at least a detectable (by any recognized method, e.g., xylene extractables, etc.) amount of crosslinking in the composition or blend under crosslinking conditions.

Thermoplastic Polymer

Any thermoplastic polymer that will form a matrix within which a cyclic siloxane can be polymerized can be used in the practice of this invention. Preferably, the thermoplastic polymer can be functionalized with silane groups. Thermoplastic polymers are characterized by their ability to melt to a liquid when heated and freeze to a brittle, glassy state when sufficiently cooled. Many thermoplastic polymers are of a high-molecular-weight and comprise chains associate through weak Van der Waals forces (e.g., polyethylene); and/or exhibit strong dipole-dipole interactions and hydrogen bonding (e.g., nylon), and/or even exhibit stacking of aromatic rings (e.g., polystyrene). Thermoplastic polymers differ from thermoset polymers (e.g., vulcanized rubber) as they can, unlike thermoset polymers, be re-melted and re-molded. Many thermoplastic materials are addition polymers; e.g., vinyl chain-growth polymers such as polyethylene and polypropylene. Representative thermoplastic polymers include, but are not limited to, polyesters, polycarbonates, polyurethanes, nylon, polyvinylchloride and polyolefins.

One particularly preferred class of thermoplastic polymer useful as the matrix polymer in the practice of this invention is the polyolefins. These thermoplastic polymers include both polyolefin homopolymers and interpolymers. Examples of polyolefin homopolymers are the homopolymers of ethylene and propylene. Examples of the polyolefin interpolymers are the ethylene/α-olefin interpolymers and the propylene/α-olefin interpolymers. The α-olefin is preferably a $C_{3-20}$ linear, branched or cyclic α-olefin (for the propylene/α-olefin interpolymers, ethylene is considered an α-olefin). Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, are α-olefins and can be used in place of some or all of the α-olefins described above. Similarly, styrene and its related olefins (for example, α-methylstyrene, etc.) are α-olefins for purposes of this invention. Illustrative polyolefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. The copolymers can be random or blocky.

The polyolefin can also be a copolymer comprised of ethylene and unsaturated esters or acids, and these polyolefins are well known and can be prepared by conventional high-pressure techniques. The unsaturated esters can be alkyl acrylates, alkyl methacrylates, or vinyl carboxylates. The alkyl groups can have 1 to 8 carbon atoms and preferably have 1 to 4 carbon atoms. The carboxylate groups can have 2 to 8 carbon atoms and preferably have 2 to 5 carbon atoms. The portion of the copolymer attributed to the ester comonomer can be in the range of 1 to 50 percent by weight based on the weight of the copolymer. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. Examples of the unsaturated acids include acrylic acids or maleic acids.

More specific examples of olefinic interpolymers useful in this invention include very low density polyethylene (VLDPE) (e.g., FLEXOMER® ethylene/1-hexene polyethylene made by The Dow Chemical Company), homogeneously branched, linear ethylene/α-olefin copolymers (e.g. TAFMER® by Mitsui Petrochemicals Company Limited and EXACT® by Exxon Chemical Company), homogeneously branched, substantially linear ethylene/α-olefin polymers (e.g., AFFINITY® and ENGAGE® polyethylene available from The Dow Chemical Company), and olefin block copolymers such as those described in U.S. Pat. No. 7,355,089 (e.g., INFUSE® available from The Dow Chemical Company). The more preferred polyolefin copolymers are the homogeneously branched linear and substantially linear ethylene copolymers. The substantially linear ethylene copolymers are especially preferred, and are more fully described in U.S. Pat. Nos. 5,272,236, 5,278,272 and 5,986,028.

The polyolefin copolymers useful in the practice of this invention also include propylene, butene and other alkene-based copolymers, e.g., copolymers comprising a majority of units derived from propylene and a minority of units derived from another α-olefin (including ethylene). Exemplary propylene polymers useful in the practice of this invention include the VERSIFY® polymers available from The Dow Chemical Company, and the VISTAMAXX® polymers available from ExxonMobil Chemical Company.

Blends of any of the above olefinic interpolymers can also be used in this invention, and the polyolefin copolymers can be blended or diluted with one or more other polymers to the extent that, in a preferred mode, the polyolefin copolymers of this invention constitute at least about 50, preferably at least about 75 and more preferably at least about 80, weight percent of the thermoplastic polymer component of the blend.

The polyolefins, particularly the ethylene polymers, useful in the practice of this invention typically have, before grafting, a density of less than 0.965, preferably less than 0.93, grams per cubic centimeter (g/cm$^3$). The ethylene copolymers typically have a density greater than 0.85, preferably greater than 0.86, g/cm$^3$. Density is measured by the procedure of ASTM D-792. Generally, the greater the α-olefin content of the interpolymer, the lower the density and the more amorphous the interpolymer. Low density polyolefin copolymers are generally characterized as semi-crystalline, flexible and having good optical properties, e.g., high transmission of visible and UV-light and low haze.

The ethylene polymers useful in the practice of this invention typically have, before grafting, a melt index greater than 0.10 and preferably greater than 1 gram per 10 minutes (g/10 min). The ethylene polymers typically have a melt index of less than 500 and preferably of less than 100, g/10 min. Melt index is measured by the procedure of ASTM D-1238 (190° C./2.16 kg).

Preferably, the polyolefin resins used in the practice of this invention contain alkoxysilane groups (also known as silane crosslinkers). Typically, the alkoxysilane groups are grafted to a polyolefin resin. Any silane that will effectively graft to and react with a silicone polymer can be used in the practice of this invention. Suitable silanes include unsaturated silanes that comprise an ethylenically unsaturated hydrocarbyl group, such as a vinyl, allyl, isopropenyl, butenyl, cyclohexenyl or γ-(meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes are the unsaturated alkoxy silanes which can be grafted onto the polymer. These silanes and their method of preparation are more fully described in U.S. Pat. No. 5,266,627. Vinyl trimethoxy silane, vinyl triethoxy silane, γ-(meth) acryloxy propyl trimethoxy silane and mixtures of these silanes are the preferred silane crosslinkers for is use in this invention.

Alternatively, silane copolymers, e.g., SILINK™ poly (ethylene-co-vinyltrimethoxysilane) copolymer, can be used in place of or in combination with olefin polymers grafted or otherwise modified with alkoxysilane groups.

The silane crosslinker is grafted to the polyolefin by any conventional method, typically in the presence of a free radical initiator e.g. peroxides and azo compounds, or by ionizing radiation, etc. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, and tert-butyl peracetate. A suitable azo compound is azobisisobutyl nitrile. The amount of initiator can vary, but it is typically present in an amount of at least 0.02, preferably at least 0.03, phr. Typically, the initiator does not exceed 0.15, preferably it does not exceed about 0.10, phr. The ratio of silane crosslinker to initiator also can vary widely, but the typical crosslinker:initiator ratio is between 10:1 to 150:1, preferably between 18:1 and 100:1.

While any conventional method can be used to graft the silane crosslinker to the polyolefin, one preferred method is blending the two with the initiator in the first stage of a reactive extruder, such as a Buss kneader. The grafting conditions can vary but for polyethylene the melt processing temperatures for grafting are typically between 160 and 260° C., preferably between 190 and 230° C., depending upon the residence time and the half life of the initiator.

The amount of silane crosslinker used in the practice of this invention, either as a group grafted to a polyolefin backbone or as unit incorporated into the polymer chain as in a silane copolymer, can vary widely depending upon the nature of the polyolefin or silane copolymer, the silane, the processing conditions, the grafting efficiency, the ultimate application, and similar factors, but typically at least 0.2, preferably at least 0.5, wt % is used based on the weight of the copolymer. Considerations of convenience and economy are usually the two principal limitations on the maximum amount of silane crosslinker used in the practice of this invention, and typically the maximum amount of silane crosslinker does not exceed 5, preferably it does not exceed 3, wt % based on the weight of the copolymer.

Cyclic Siloxanes

Starting materials for the ring-opening polymerization reaction are cyclosiloxanes (also known as cyclic siloxanes). Cyclic siloxanes which are useful are well known and commercially available materials. They have the general formula $(R_2SiO)_n$, in which R denotes hydrogen or an optionally substituted alkyl, alkenyl, aryl, alkaryl or aralkyl group having up to 20 carbon atoms, n denotes an integer with a value of from 3 to 12. R can be substituted, e.g. by halogen such as fluorine or chlorine. The alkyl group can be, for example, methyl, ethyl, n-propyl, trifluoropropyl, n-butyl, sec-butyl, and tert-butyl. The alkenyl group can be, for example, vinyl, allyl, propenyl, and butenyl. The aryl and aralkyl groups can be, for example, phenyl, tolyl, and benzyl. The preferred groups are methyl, ethyl, phenyl, vinyl, and trifluoropropyl. Preferably at least 80% of all R groups are methyl or phenyl groups, most preferably methyl. Even more preferably substantially all R groups are methyl groups. Preferably the value of n is from 3 to 6, most preferably 4 or 5. Examples of suitable cyclic siloxanes are hexamethylcyclotrisiloxane, octamethylcyclotetrasiloxane, decamethylcyclopentasiloxane, penta(methylvinyl)cyclopentasiloxane, tetra(phenylmethyl) cyclotetrasiloxane and pentamethylhydrocyclopentasiloxane. One particularly suitable commercially available material is a mixture of octamethylcyclotetrasiloxane and decamethylcyclopentasiloxane. Where R is methyl, the compound is referred to as Dn; for example, where n=4 the compound is called D4 or $D_4$.

Suitable cyclic starting materials include cyclosiloxanes comprising different siloxane units as well as other cyclics which, besides the siloxane moiety, have also other atoms or groups of atoms in their rings. Examples include the following three known cyclic compounds.

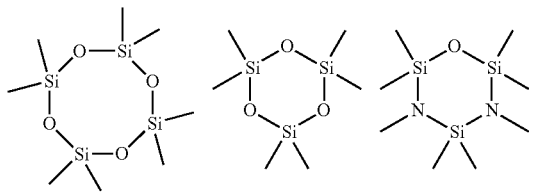

Catalyst

In principle, any phosphazene base is suitable for use as the ring-opening catalyst in the present invention. Phosphazene bases have the core structure P=N, in which free N valencies are linked to hydrogen, hydrocarbon, —P=N or =P—N, and free P valencies are linked to —N or —N. A wide range of suitable phosphazene bases has been described in Schwesinger et al, *Liebigs Ann.* 1996, 1055-1081. Some phosphazene bases are commercially available from Fluka Chemie AG, Switzerland. The phosphazene bases preferably have at least three P-atoms. Some preferred phosphazene bases are of the following general formulae:

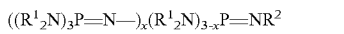

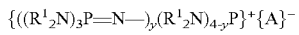

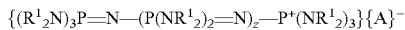

in which $R_1$, which may be the same or different in each position, is hydrogen or an optionally substituted hydrocarbon group, preferably a $C_1$-$C_4$ alkyl group, or in which two $R_1$ groups bonded to the same N atom may be linked to complete a heterocyclic ring, preferably a 5- or 6-membered ring; $R_2$ is hydrogen or an optionally substituted hydrocarbon group, preferably a $C_1$-$C_{20}$ alkyl group, more preferably a $C_1$-$C_{10}$ alkyl group; x is 1, 2 or 3, preferably 2 or 3; y is 1, 2, 3 or 4, preferably 2, 3 or 4; z is an integer of from 1 to 10, preferably 1, 2, or 3; and A is an anion, preferably fluoride, hydroxide, silanolate, alkoxide, carbonate or bicarbonate.

The compounds of the formula $\{(R^1_2N)_3P=N-(P(NR^1_2)_2=N)_z-P^+(NR^1_2)_3\}\{A\}^-$ may be made by a method which comprises reacting a linear phosphonitrile halide compound, preferably chloride, with a compound selected from a secondary amine, a metal amide and a quaternary ammonium halide to form an aminated phosphazene material, followed by an ion exchange reaction replacing the anion with a nucleophile. Phosphonitrile halide compounds and methods of making them are well known in the art; for example, one particularly useful method includes the reaction of $PCl_5$ with $NH_4Cl$ in the presence of a suitable solvent. Secondary amines are the preferred reagent for reaction with the phosphonitrile halide, and a suitable secondary amine has the formula $R^3_2NH$, in which $R^3$ is a hydrocarbon group having up to 10 carbon atoms, or both $R^3$ groups form a heterocyclic group with the nitrogen atom, for example a pyrollidine group, a pyrrole group or a pyridine group. Preferably, $R^3$ is a lower alkyl group, more preferably a methyl group, or both $R^3$ groups form a pyrollidine ring. Suitable preferred secondary amines include dimethylamine, diethylamine, dipropylamine and pyrollidine. Preferably the reaction is carried out in the presence of a material which is able to capture the exchanged halides, e.g. an amine such as triethylamine. The resulting by-product (e.g. triethylammonium chloride) can then be removed from the reaction mixture, e.g. by filtration. The reaction may be carried out in the presence of a suitable solvent for the phosphonitrile chloride and linear phosphazene base. Suitable solvents include aromatic solvents such as toluene. The linear phosphazene material which is formed this way must then be passed through an ion exchange reaction (preferably an ion exchange resin) in which the anion is replaced with a hard nucleophile, preferably hydroxyl or alkoxy, most preferably hydroxyl. Suitable ion exchange systems include any known ion exchange systems, e.g. ion exchange resins, and no further detailed description is given. The phosphazene is preferably dispersed in a suitable medium prior to passing through an ion exchange system. Suitable media include water, alcohol and mixtures of the two. In particularly preferred phosphazene base compounds for use in the present invention, $R^1$ is methyl, $R^2$ is tert-butyl or tert-octyl, x is 3, y is 4 and A is fluoride or hydroxide.

Process

The process of the invention is the preparation of reactive blends and copolymers of silicones and thermoplastic polymers by carrying out ring opening polymerization of cyclic siloxanes within a thermoplastic polymer matrix. The process itself can follow one of at least three lines. In one line, a cyclic siloxane is added to a thermoplastic polymer under ring-opening conditions, and the cyclic siloxane undergoes polymerization thus forming a reactive blend of thermoplastic polymer and polymerized siloxane, i.e., the silicone polymer. This thermoplastic polymer component of this reactive blend can optionally be crosslinked using standard crosslinking techniques, e.g., if the thermoplastic polymer is a polyolefin, then contacting the polyolefin with peroxide under crosslinking conditions. The ring-opening of the cyclic siloxane can be facilitated through the use of a ring-opening catalyst.

In a second line, a cyclic siloxane is added to a silane-functionalized thermoplastic polymer, e.g., a polyolefin, under ring-opening conditions, the cyclic siloxane undergoes polymerization thus forming a silicone polymer, and the silicone polymer then reacts with the silane groups of the thermoplastic polymer thus forming a reactive copolymer product. The conditions necessary to promote the reaction between the silicone polymer and the silane groups of the thermoplastic polymer are essentially the same as those necessary to promote the ring-opening of the cyclic siloxane. As in the first line, the ring-opening of the cyclic siloxane can be facilitated with a ring-opening catalyst, and the thermoplastic polymer matrix can be crosslinked, typically after the reactive copolymer product has been recovered from the reaction mixture.

In a third line, a cyclic siloxane and a silane crosslinker are added to a thermoplastic polymer under ring-opening and silane-grafting conditions (in this instance, the conditions for the ring-opening and the conditions for the silane-grafting being one and the same), the cyclic siloxane polymerizes while during this same operation the silane crosslinker grafts to the thermoplastic polymer, and the silicone polymer then reacts with the silane groups of the thermoplastic polymer to form a reactive copolymer product. As in the first and second lines, the polymerization of the cyclic siloxane can be facilitated with a catalyst, and the thermoplastic polymer matrix can optionally be crosslinked, typically after the reactive copolymer product has been recovered from the reaction mixture.

While the equipment used to make the reactive blends and copolymer products is not critical to the invention, typically these products are made in a mixing device that can impart shear to the reaction mixture. Examples of compounding equipment are internal batch mixers, such as a Banbury™ or Bolling™ internal mixer. Alternatively, continuous single, or twin screw, mixers can be used, such as Farrel™ continuous mixer, a Werner and Pfleiderer™ twin screw mixer, or a Buss™ kneading continuous extruder. The type of mixer utilized, and the operating conditions of the mixer, will affect properties of the composition such as viscosity, volume resistivity and extruded surface smoothness.

Thermoplastic polymer, typically already containing silane functionality, is fed to the extruder followed by the cyclic siloxane and, if used, the ring-opening catalyst as well as any other process additives that might be used. The reaction mixture is subjected to ring-opening conditions including a temperature between the melting point of the thermoplastic polymer and 200° C. (for polyolefins), the exact temperature dependent upon a number of different variables not the least of which is whether the ring-opening is to occur during mixing, processing or post-processing. The pressure can range from sub-atmospheric to super-atmospheric. In a reaction extruder, the pressure can approach or exceed 10,000 psi (70 megaPascal, mPa) while in an open batch mixer, the pressure is typically ambient (0.1 mPa).

If the silane-grafting of the thermoplastic polymer is conducted in the same operation as the cyclic siloxane is ring-opened and polymerized, then this can be conducted by one of two methods. One method is to use a long extruder that is equipped with a silane-grafting zone followed by a ring-opening/polymerization reaction zone. Alternatively, the silane-grafting and silicone reactions may occur more or less simultaneously. Nevertheless, the preferred mode from the standpoint of technical control over the chemistry is to start with a thermoplastic polymer that is already functionalized with a silane, such as SI-LINK™ copolymer or PE-g-VTMS (polyethylene grafted with vinyl trimethoxy silane).

The amount of cyclic siloxane in the reaction mixture is typically between 0.1 and 85, preferably between 0.2 and 20, weight percent (wt %) based on the weight of the reaction mixture. The amount of thermoplastic polymer in the reaction mixture is typically between 15 and 99.9, preferably between 10 and 95, wt % based on the weight of the reaction mixture. The amount of catalyst in the reaction mixture, if present at all, is between 10 parts per million (ppm) and 5 wt % based on the weight of the reaction mixture.

In those cases in which relatively high levels, e.g., at least 5 wt % based on the combined weight of the thermoplastic polymer and silicone polymer, of silicone are desired in the polyolefin-silicone reactive blends or copolymers, the addition of the cyclic siloxanes in multiple doses may be desirable to allow the earlier doses to partially or completely react into the system prior to adding more cyclic silicone. This helps avoid potential process challenges associated with large amounts of cyclic siloxanes, many of which are liquids.

Anionic or cationic ring-opening polymerization is possible, and options exist for kinetic or thermodynamic control of the reaction products by choice of silicone, catalyst, and other conditions. Depending on the nature of the initiator, mono or dihydroxy silicones can be formed, with or without active anionic end groups. Thus, the resulting silicones and intermediates can readily participate in functionalization and crosslinking reactions with thermoplastic polymers that are grafted with silanes.

Inclusion of functional silicone groups during ring-opening/polymerization can be used to impart additional properties. For example, the inclusion of some vinyl functionalized silicones can be incorporated into the silicone polymer to facilitate peroxide crosslinking. In addition, end groups may be provided, for example as shown in the following equation.

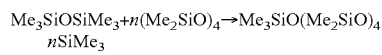

in which Me is methyl and n is the amount of cyclic siloxane added. The ratio of $Me_3SiOSiMe_3$ to $(Me_2SiO)_4$ determines the stoichiometry of the resulting silicone, and the total amount of $Me_3SiOSiMe_3$ and $(Me_2SiO)_4$ determines the amount of silicone present relative to the thermoplastic polymer.

Branch points can be introduced into the silicone polymers by the inclusion of T or Q groups (most commodity polydimethylsiloxanes consist of D groups as repeat units). These groups are shown schematically below.

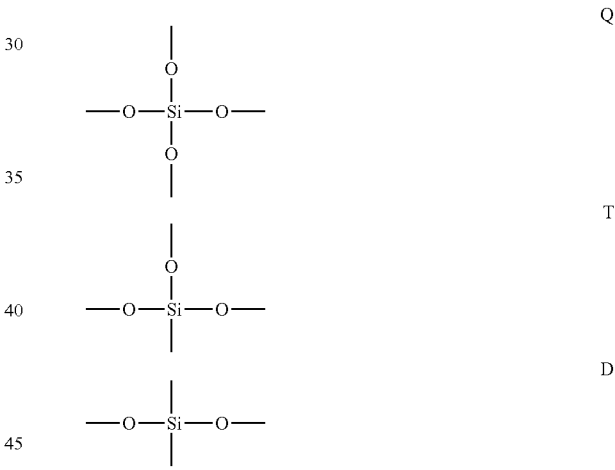

M groups to control molecular weight and chain length can be provided by inclusion of various sources of M units,

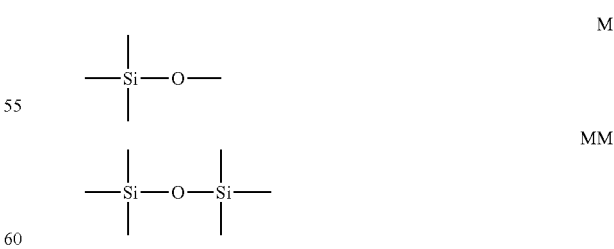

including hexamethyldisolaxane or short methyl terminated silicones, which deliver M or MM end groups along with a few extra D groups.

The reactive blends and copolymers of this invention may contain additional additives including but not limited to antioxidants, curing agents, cross linking co-agents, boosters and retardants, processing aids, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, and metal deactivators. Additives can be used in amounts ranging from less than 0.01 to more than 10 wt % based on the weight of the composition, i.e., the reactive blend or copolymer product.

Examples of antioxidants are as follows, but are not limited to: hindered phenols such as tetrakis[methylene(3,5-di-tert-butyl-4-hydroxyhydro-cinnamate)]methane; bis[(beta-(3,5-ditert-butyl-4-hydroxybenzyl)-methylcarboxyethyl)]sulphide, 4,4'-thiobis(2-methyl-6-tert-butylphenol), 4,4'-thiobis (2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-demthylbenzyl)diphenylamine, diphenyl-p-phenylenediamine, mixed di-aryl-p-phenylenediamines, and other hindered amine antidegradants or stabilizers. Antioxidants can be used in amounts of 0.1 to 5 wt % based on the weight of the composition.

Examples of curing agents (e.g., crosslinking initiators for a polyolefin) are as follows: dicumyl peroxide; bis(alpha-t-butyl peroxyisopropyl)benzene; isopropylcumyl t-butyl peroxide; t-butylcumylperoxide; di-t-butyl peroxide; 2,5-bis(t-butylperoxy)2,5-dimethylhexane; 2,5-bis(t-butylperoxy)2,5-dimethylhexyne-3; 1,1-bis(t-butylperoxy)3,3,5-trimethylcyclohexane; isopropylcumyl cumylperoxide; di(isopropylcumyl) peroxide; or mixtures thereof. Peroxide curing agents can be used in amounts of 0.1 to 5 wt % based on the weight of the composition. Various other known curing co-agents, boosters, and retarders, can be used, such as triallyl isocyanurate; ethyoxylated bisphenol A dimethacrylate; α-methyl styrene dimer; and other co-agents described in U.S. Pat. Nos. 5,346,961 and 4,018,852.

Examples of processing aids include but are not limited to metal salts of carboxylic acids such as zinc stearate or calcium stearate; fatty acids such as stearic acid, oleic acid, or erucic acid; fatty amides such as stearamide, oleamide, erucamide, or N,N'-ethylenebisstearamide; polyethylene wax; oxidized polyethylene wax; polymers of ethylene oxide; copolymers of ethylene oxide and propylene oxide; vegetable waxes; petroleum waxes; non ionic surfactants; and polysiloxanes. Processing aids can be used in amounts of 0.05 to 5 wt % based on the weight of the composition.

Examples of fillers include but are not limited to clays, precipitated silica and silicates, fumed silica calcium carbonate, ground minerals, and carbon blacks. Fillers can be used in amounts ranging from less than 0.01 to more than 50 wt % based on the weight of the composition.

Examples of flame retardants include but are not limited to magnesium hydroxide, aluminum trihydroxide, huntite, hydromagnesite, antimony trioxide, potassium hydroxide, calcium phosphate, zirconium oxide, titanium oxide, zinc oxide, magnesium oxide, magnesium carbonate, calcium carbonate, barium sulfate, barium borate, meta-barium borate, zinc borate, meta-zinc borate, aluminum anhydride, molybdenum disulfide, clay, red phosphorus, diatomite, kaolinite, montmorilonite, hydrotalcite, talc, silica, white carbon, celite, asbestos, and lithopone. Magnesium hydroxide and aluminum trihydroxide are preferred flame retardants.

Applications

The silicone-thermoplastic polymer, particularly silicone-polyolefin, reactive blend and copolymer products made by the process of this invention can be used in applications that require thermal stability, ozone and weathering resistance, oxidative stability, lubricity, water repellency, low surface tension, good electrical properties, low temperature properties, oil, moisture and steam resistance, chemical resistance, and/or flame resistance. Such applications include: include spark plug boots and ignition wire jackets; automotive front wheel drive axle boots, gaskets, seals, O-rings, protective coatings as well as radiator and heater hoses for trucks and buses; polymeric power transmission insulators as well as cable accessories (connectors and terminations and outdoor insulators); cable jackets and insulations, including flame retardant versions.

The reactive blends and copolymers of this invention are also useful as compatibilizers. For example, silicones are often added to polyolefins to impart various beneficial properties. Typically, the silicones are not highly compatible with polyolefins, resulting in poor morphology and exudation. Inclusion of a small amount of one of the copolymers or reactive blends of this invention can result in improved morphology in blends of silicones and polyolefins. Furthermore, inclusion of a small amount of one of these copolymers or reactive blends during reactive processing of silicones with polyolefins, or silane-grafted polyolefins, can provide enhanced reaction rates and morphology due to the improved mixing that can result from compatibilization. In some cases, the compatibilizer is first prepared in solution to ensure intimate mixing and morphology. Only a small amount of such a compatibilizer would likely be required.

Ring-opening polymerization of octamethylcyclotetrasiloxane provides a method to form siloxane-thermoplastic polymer, particularly silicone-polyolefin, graft co-polymers. This method, at some levels, can be superior to the condensation of silanol-terminated polydimethyl silane (PDMS) because it allows for greater control over reaction products. For example, by initiating or catalyzing the reaction with —OH or H+, a di-functional PDMS chain can be obtained, which is terminated by two hydroxide groups. This product can subsequently react with VTMS-grafted polyolefin to form a crosslinked co-polymer. On the other hand, simply by selecting a different catalyst (e.g. a carbanion), a mono-functional PDMS chain can be formed. The chain can then graft to trimethoxysilane groups while the blend, as a whole, remains thermoplastic.

The following examples illustrate various embodiments of this invention. All parts and percentages are by weight unless otherwise indicated.

SPECIFIC EMBODIMENTS

The extent of octamethylcyclotetrasiloxane (D4) polymerization can be followed using FTIR Spectroscopy. As can be seen from the following examples and FIG. 1, D4 (top plot) exhibits a single peak at approximately 1075 cm−1. The onset of polymerization is initially marked by the appearance of a small shoulder at the right side of the D4 peak (bottom plot). As polymerization progresses, the small shoulder increases at the expense of the single D4 peak. This continues until two peaks, of approximately equal magnitude, are apparent at 1010 $cm^{-1}$ and 1095 $cm^{-1}$. This signals the formation of a PDMS chain.

Two Brabender mixer reactions are performed to examine the feasibility of using the ring-opening/polymerization of D4 as a means of forming PDMS/Polyolefin-graft-copolymers. In one sample an ethylene-octene copolymer with a density of 0.87 g/cm$^3$, a melt index of 5 (measured according to ASTM D1238), and available from The Dow Chemical Company is grafted with VTMS (about 1.5 percent by weight based on the weight of the polyolefin) and then soaked with 5% D4 until no visible liquid remained. The resulting pellets are added to a Brabender mixer at 100° C. and 45 RPM. The blend is allowed to flux for two minutes before adding 0.1 mL of 0.25 molar (M) P4-t-Bu Phosphazene Base solution (1-tert-butyl-4,4,4-tris(dimethylamino)-2,2-bis[tris(dimethylamino)phosphoranylidenamino]-2$^5$,4$^5$-catenadi(phosphazene) available from Fluka Analytical of Sigma-Aldrich, Inc.). D4 is allowed to react for 15 minutes before removal from the Brabender mixer. A second sample is run using a temperature of 140° C., and 0.2 mL of catalyst (0.25 M). Blending procedures (RPM, reaction time) were identical to that of the first sample.

Both experiments show evidence of the desired reaction. FTIR is performed on pressed films, and the onset of a shoulder at approximately 1025 cm$^{-1}$ is evident for both samples. The FTIR spectrum of the second sample shown in FIG. 2. The top plot depicts the initial FTIR, which still shows a substantial amount of D4. The middle plot is recorded after allowing D4 to evaporate overnight. The remaining peak at 1090 cm−1 is attributed to absorption from the VTMS grafted EG 8200 (the bottom plot).

Although the invention has been described in considerable detail through the preceding description, drawings and examples, this detail is for the purpose of illustration. One skilled in the art can make many variations and modifications without departing from the spirit and scope of the invention as described in the appended claims.

What is claimed is:

1. A process for making a copolymer product comprising units derived from a polyethylene, a silane crosslinker and a silicone polymer, the process comprising the step of simultaneously contacting within a matrix of the polyethylene and under grafting and ring-opening and polymerization conditions, the polyethylene, the silane crosslinker and a cyclic siloxane such that the silane crosslinker grafts to the polyethylene, the cyclic siloxane polymerizes to form the silicone polymer that in turn combines with the silane-grafted polyethylene to form the copolymer product, wherein the silane crosslinker is at least one of vinyl trimethoxy silane, vinyl triethoxy silane, γ-(meth)acryloxy propyl trimethoxy silane and mixtures of two or more of these silanes.

2. The process of claim 1 in which the polymerization of the cyclic siloxane is facilitated with a catalyst.

3. The process of claim 2 in which the catalyst is a phosphazene base.

4. The process of claim 3 in which the cyclic siloxane is at least one of hexamethylcyclotrisiloxane, octamethylcyclotetrasiloxane, decamethylcyclopentasiloxane, penta(methylvinyl)-cyclopentasiloxane, tetra(phenylmethyl)cyclotetrasiloxane and pentamethylhydro-cyclopentasiloxane.

* * * * *